US012021688B2

(12) United States Patent
Stormont et al.

(10) Patent No.: US 12,021,688 B2
(45) Date of Patent: Jun. 25, 2024

(54) DYNAMIC NETWORK CONFIGURATION FOR PRINTERS

(71) Applicant: ZEBRA TECHNOLOGIES CORPORATION, Lincolnshire, IL (US)

(72) Inventors: Brian C Stormont, Uxbridge, MA (US); Gerard R. Corriveau, Blackstone, MA (US); Gordon E. Molek, Vernon Hills, IL (US); Steven R Brightman, Providence, RI (US)

(73) Assignee: Zebra Technologies Corporation, Lincolnshire, IL (US)

( * ) Notice: Subject to any disclaimer, the term of this patent is extended or adjusted under 35 U.S.C. 154(b) by 49 days.

(21) Appl. No.: 17/885,060

(22) Filed: Aug. 10, 2022

(65) Prior Publication Data

US 2024/0056354 A1 Feb. 15, 2024

(51) Int. Cl.

*G06F 3/12* (2006.01)
*H04L 41/0823* (2022.01)
*H04W 76/10* (2018.01)
*H04W 84/12* (2009.01)

(52) U.S. Cl.

CPC ........ *H04L 41/0823* (2013.01); *G06F 3/1218* (2013.01); *G06F 3/1236* (2013.01); *G06F 3/1286* (2013.01); *H04W 76/10* (2018.02); *H04W 84/12* (2013.01)

(58) Field of Classification Search

CPC .... G06F 3/1218; G06F 3/1236; G06F 3/1286; H04L 41/0823; H04W 76/10; H04W 84/12

USPC .......................................................... 370/338

See application file for complete search history.

(56) References Cited

U.S. PATENT DOCUMENTS

| | | | | |
|---|---|---|---|---|
| 6,594,028 | B1 | 7/2003 | Hamamoto et al. | |
| 2013/0080644 | A1* | 3/2013 | Kimura ................. | H04W 8/245 709/227 |
| 2016/0328187 | A1* | 11/2016 | Nathani .............. | H04W 64/003 |
| 2019/0286385 | A1 | 9/2019 | Minegishi | |
| 2020/0029264 | A1 | 1/2020 | Wang et al. | |
| 2020/0037372 | A1 | 1/2020 | Rajendiran et al. | |
| 2021/0174347 | A1* | 6/2021 | Rose ................... | H04L 63/0428 |
| 2021/0300023 | A1 | 9/2021 | Kubo | |
| 2022/0095144 | A1 | 3/2022 | Ren et al. | |
| 2022/0229619 | A1 | 7/2022 | Lao | |
| 2023/0418477 | A1* | 12/2023 | Muthiah ............... | G06F 3/0658 |

OTHER PUBLICATIONS

International Search Report and Written Opinion for International Application No. PCT/US2023/28225 dated Oct. 19, 2023.

* cited by examiner

*Primary Examiner* — Allen H Nguyen

(57) ABSTRACT

A method in a server includes: storing, at the server, a configuration update definition including (i) criteria, and (ii) configuration update payload data; obtaining at the server, from a computing device having a connection to a wireless local area network (WLAN), a parameter of the connection; determining whether the parameter satisfies the criteria of the configuration update definition; and in response to determining that the parameter satisfies the criteria, transmitting the configuration update payload data to the computing device.

18 Claims, 6 Drawing Sheets

DYNAMIC NETWORK CONFIGURATION FOR PRINTERS

BACKGROUND

Media processing devices such as desktop label printers, e.g., for home or small business use, may rely on wireless network connections, e.g., to wireless local area networks (WLANs). Various factors can affect the quality of such network connections, including for example the physical environment in which the printer is deployed, and/or certain characteristics of the devices implementing the WLAN. Suboptimal connection quality can lead to reduced and/or interrupted printing performance, consumption of technical support resources and/or personnel, customer complaints, or the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
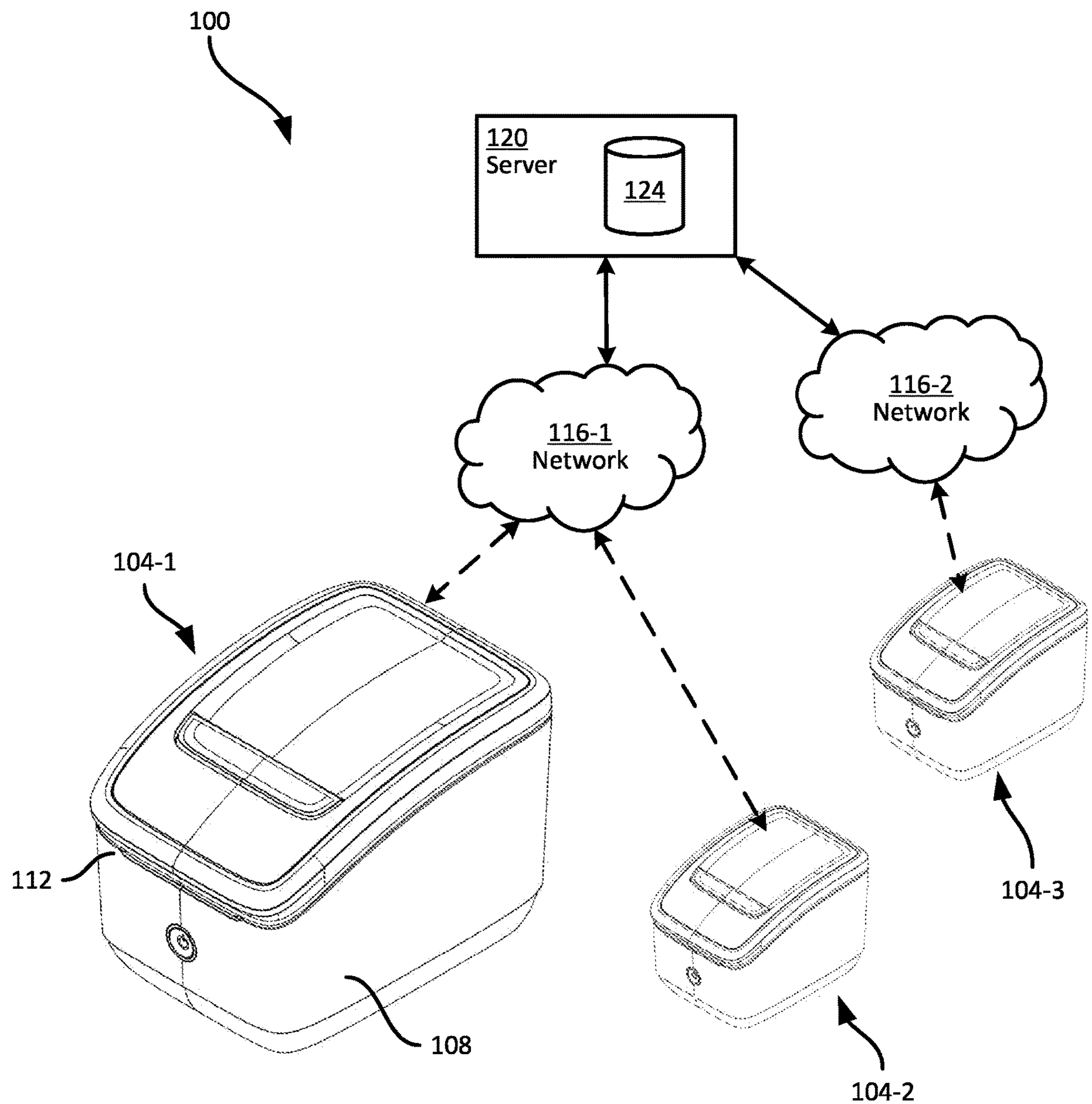
FIG. 1 is a diagram of a system for dynamic network configuration for media processing devices.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a server, comprising: storing, at the server, a configuration update definition including (i) trigger criteria, and (ii) configuration update payload data; obtaining at the server, from a computing device having a connection to a wireless local area network (WLAN), a parameter of the connection; determining whether the parameter satisfies the trigger criteria of the configuration update definition; and in response to determining that the parameter satisfies the trigger criteria, transmitting the configuration update payload data to the computing device.

Additional examples disclosed herein are directed to a server, comprising: a memory storing a configuration update definition including (i) trigger criteria, and (ii) configuration update payload data; and a processor configured to: obtain, from a computing device having a connection to a wireless local area network (WLAN), a parameter of the connection; determine whether the parameter satisfies the trigger criteria of the configuration update definition; and in response to determining that the parameter satisfies the trigger criteria, transmit the configuration update payload data to the computing device.

Further examples disclosed herein are directed to a printer, comprising: a housing configured to receive a supply of print media; a print head supported by the housing; a wireless communications interface supported by the housing; a memory supported by the housing, storing a plurality of network configuration settings; and a processor supported by the housing, the processor configured to: establish a connection with a wireless local area network (WLAN); collect a plurality of connection parameters associated with the connection; transmit the connection parameters to a server; receive an update configuration command from the server, based on the transmitted connection parameters; and modify at least one of the network configuration settings according to the update configuration command.

FIG. 1 illustrates a system 100 for dynamic network configuration in media processing devices such as printers. The system 100 thus includes at least one media processing device. In the illustrated example, the system 100 includes three example media processing devices 104-1, 104-2, and 104-3 (collectively referred to as media processing devices 104, and generically as a media processing device 104; similar nomenclature may be used for other components herein for which multiple instances are shown). The media processing devices 104 in this example are printers, such as desktop label printers, and are therefore also referred to as printers 104. In other examples, the media processing devices 104 can include radio frequency identification (RFID) tag writing functionality instead of or in addition to printing functionality. In further examples, the media processing devices 104 can be other computing devices, such as a mobile computers, barcode scanners, and the like.

Each printer 104 includes a housing 108 (the housing 108-1 of the printer 104-1 being shown in FIG. 1) supporting a media supply, such as a roll of labels, receipt paper, or the like. Indicia are applied to the media via thermal printing, direct thermal printing, or the like. The media is then dispensed, e.g. from an outlet slot 112 defined in the housing 108.

Each printer 104 can receive instructions to execute a print job, alter configuration settings, or the like, via an internal wireless network interface. The printer 104 can be configured, via the wireless network interface, to establish a connection with a network 116, such as a wireless local area network (WLAN), e.g., a WiFi network. FIG. 1 illustrates two distinct networks 116-1 and 116-2, which can be deployed in different locations (e.g., different residences or businesses) in which subsets of the printers 104 are deployed. Each network 116 is implemented by at least one (and in some cases, more than one) access point (AP), with which printers 104 can communicate to establish a connection with the relevant network 116.

A variety of factors can affect the wireless connection between a printer 104 and a network 116. For example, the physical distance between the printer 104 and the access point to which the printer 104 is connected, and/or the presence of obstacles such as walls between the printer 104 and the access point can lead to increased latency (e.g., due to transmission failures leading to packet retransmissions), loss of the connection, weak received signal strength at either or both of the printer 104 and the access point, and the like. In other examples, certain access points may be prone to suboptimal performance under certain conditions, such as when a printer 104 makes use of a particular network configuration setting.

Scenarios such as those mentioned above can impede the performance of the printers 104, e.g., by interrupting print operations or slowing such operations. Operators of the printers 104, however, may have insufficient access to network parameters and/or technical expertise to diagnose or resolve connectivity issues with a printer 104. Performance problems may therefore go unresolved, or may necessitate contact with technical support staff (e.g., provided by a manufacturer of the printers 104).

The system 100 also includes a server 120, configured to collect various network parameters from the printers 104, for processing and/or storage in a central repository 124. In some examples, the server 120 also routes print jobs to the printers 104, e.g., upon receiving such print jobs from operator computing devices (e.g., mobile computers or the like). The printers 104, in other words, may be configured to establish connections with the server 120 for regular operation, and such connections can then also be used for the collection of network parameters.

As will be discussed below in greater detail, the server 120 is configured to collect network parameters from the printers 104 as noted above, and can aggregate the network parameters to generate reports thereof and/or detect trends therein. Such processing of the collected network parameters enables the server 120 to obtain, either automatically or as input data from an operator of the server 120, configuration update definitions. Each configuration update definition includes one or more criteria and configuration update payload data. In general, when the criteria are satisfied by the network parameters collected from a given printer 104, the payload data is provided to that printer 104. The nature of the criteria and the payload data vary, as discussed below. For instance, the criteria can specify certain conditions recognized (e.g., from aggregated network parameters from a plurality of printers 104) as being associated with suboptimal wireless connectivity. The payload data can therefore include data that dynamically reconfigures the relevant printer 104 to improve wireless connectivity. The payload data can therefore include network configuration settings, a firmware upgrade, or the like.

Figure 2:
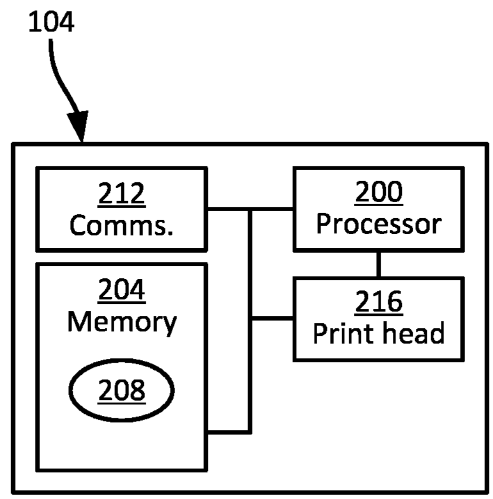
FIG. 2 is a diagram of certain internal components of a media processing device, and a server, from the system of FIG. 1.
Figure 2:
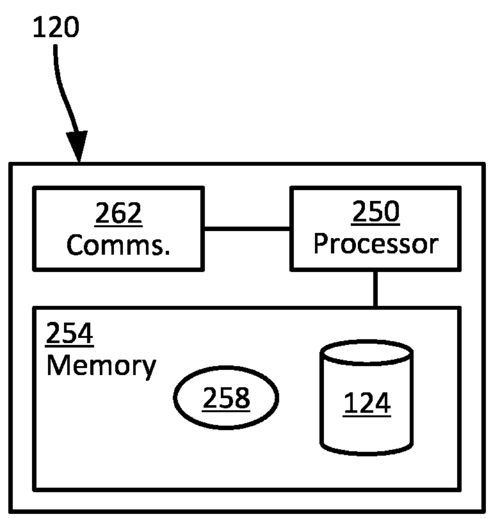

Turning to FIG. 2, certain internal components of an example printer 104 are shown. Each printer 104 in the system 100 includes those components, although the printers 104 can have distinct form factors, versions of each component, and the like.

The printer 104 as shown in FIG. 2 includes a processor 200 such as a central processing unit (CPU) and/or graphics processing unit (GPU), application-specific integrated circuit (ASIC), or the like, communicatively coupled with a non-transitory computer-readable storage medium such as a memory 204, e.g., a combination of volatile memory elements (e.g., random access memory (RAM)) and non-volatile memory elements (e.g., flash memory or the like). The memory 204 stores a plurality of computer-readable instructions in the form of applications, including in the illustrated example a firmware application 208 whose execution by the processor 200 configures the printer 104 to transmit network parameters to the server 120, and to receive and apply configuration updates from the server 120. Execution of the application 208, or other applications (not shown) stored in the memory 204, can also configure the printer 104 to execute print jobs, establish connections with networks 116, and the like.

The printer 104 also includes a communications interface 212, enabling the printer 104 to establish connections with WLANs, such as the networks 116 shown in FIG. 1. The communications interface 212 can therefore include any suitable combination of transceivers, antenna elements, and corresponding control hardware enabling communications with the networks 116.

The printer 104 also includes, in this example, a print head 216 controllable to apply indicia to the media from the supply. The print head 216 can include a thermal print head, e.g. with an array of independently controllable thermal elements to activate pigment in the media, and/or to transfer pigment from a ribbon within the housing 108 to the media. In other examples, the print head 216 can employ impression technologies other than thermal printing.

Also shown in FIG. 2 are certain internal components of the server 120. The server 120 includes a processor 200 such as a CPU and/or GPU, communicatively coupled with a non-transitory computer-readable storage medium such as a memory 254. The memory 254 stores the repository 124 mentioned in connection with FIG. 1, as well as instructions executable by the processor 250, e.g., in the form of an application 258, to perform functionality related to the collection and processing of network parameters from the printers 104, and the dynamic reconfiguration of the printers 104 based on the configuration update definitions mentioned above.

The server 120 also includes a communications interface 262, including hardware and software components enabling the server 120 to communicate with other computing devices via one or more networks. The components of the server 120 can be deployed in an enclosure, or in a plurality of physically distributed enclosures (e.g., as a cloud-based computing system).

Figure 3:
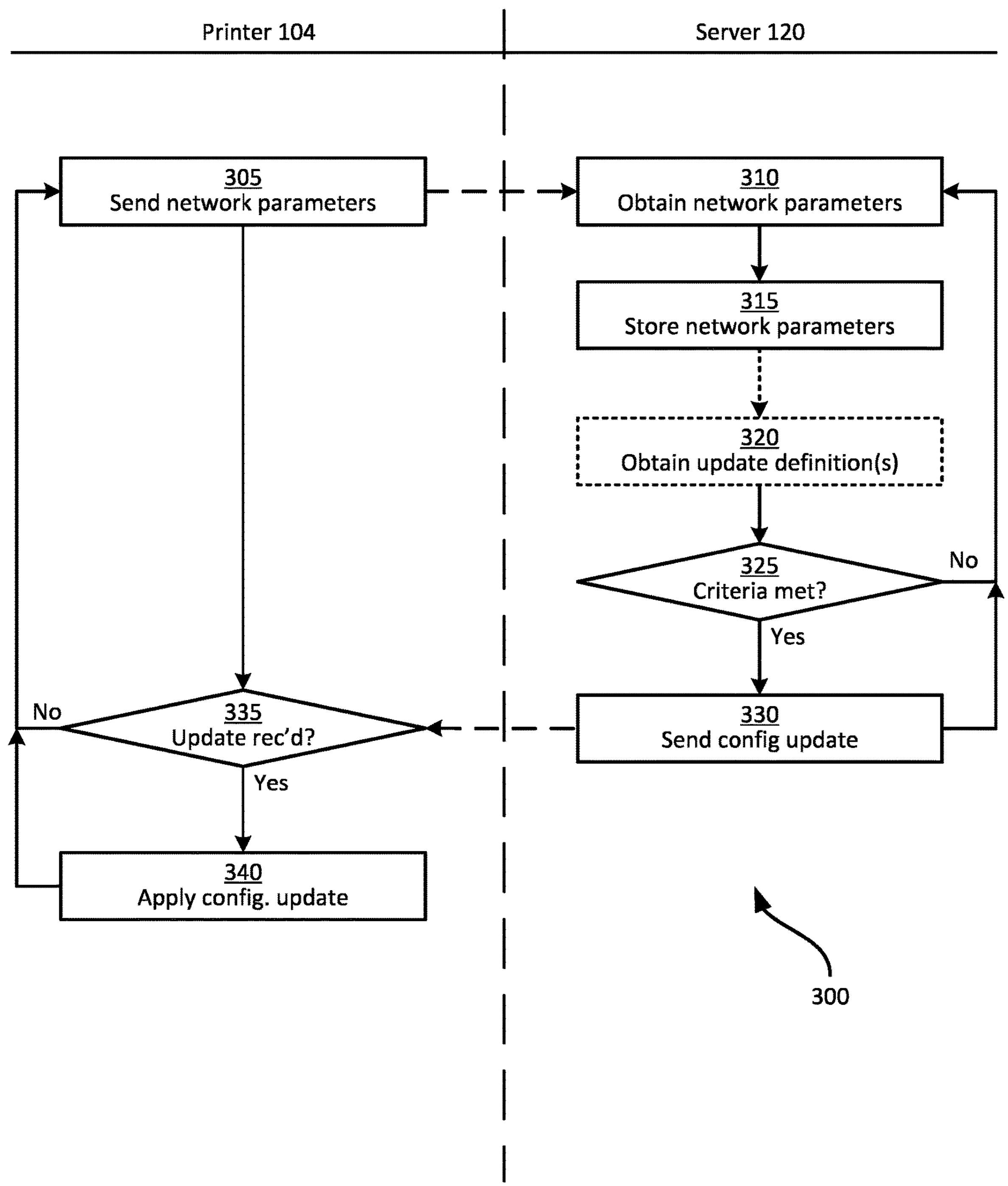
FIG. 3 is a flowchart of a method of dynamic network configuration for media processing devices.

Turning to FIG. 3, a method 300 of dynamically updating printer network configurations is illustrated. The method 300 is described below in conjunction with its example performance in the system 100. As indicated in FIG. 3, certain blocks of the method 300 are performed by the printers 104, while other blocks of the method 300 are performed by the server 120.

At block 305, the printer 104 is configured to collect and send network connection parameters to the server 120. Each printer 104, for example, can be configured to monitor various parameters in response to establishing a connection with a network 116. Those parameters can be used by the communications interface 212 to assess the state of the connection, e.g., to determine whether to attempt to roam to a different access point in the network 116, or the like. A wide variety of connection parameters can be collected by the printer 104. Examples of connection parameters include one or more samples of received signal strength indicator (RSSI) corresponding to signals received from an access point, and/or one or more samples of signal to noise ratio (SNR) corresponding to signals received from an access point. Further examples of such parameters include parameters derived from the RSSI and SNR measurements mentioned above, such as a count of RSSI samples (e.g., over a predetermined time period such an hour, a day, or the like) that fell below a threshold, such as a roam scan trigger threshold.

Additional examples of reported connection parameters include a count of failed connection attempts over a predetermined period of time, a count of pack retransmissions over a predetermined period of time, and the like.

Still further examples of parameters collected by the printer 104 include an identifier of the access point with which the printer 104 is connected. The identifier can include a media access control (MAC) address of the access point, or a portion thereof such as the original equipment identifier (OUI) indicating the manufacturer of the access point (generally a leading subset of octets of the MAC address). The parameters can further include network configuration settings employed at the printer 104 to establish the connection, such as roam scan trigger thresholds (e.g., expressed as an RSSI threshold), whether certain features are enabled or disabled, and the like. An example of such features is protected management frames (PMF), activation of which configures the printer 104 to encrypt management frames (which are otherwise generally unencrypted). A wide variety of other example features will also now occur to those skilled in the art.

The printer 104 can store scheduling and reporting settings in the memory 204, e.g., in a dedicated portion of the firmware 208 or other application executed at the printer 104. Such settings can determine, for example, how frequently the printer 104 reports connection parameters to the server 120 (e.g., daily, weekly, or the like), as well as which parameters are to be reported.

Figure 4:
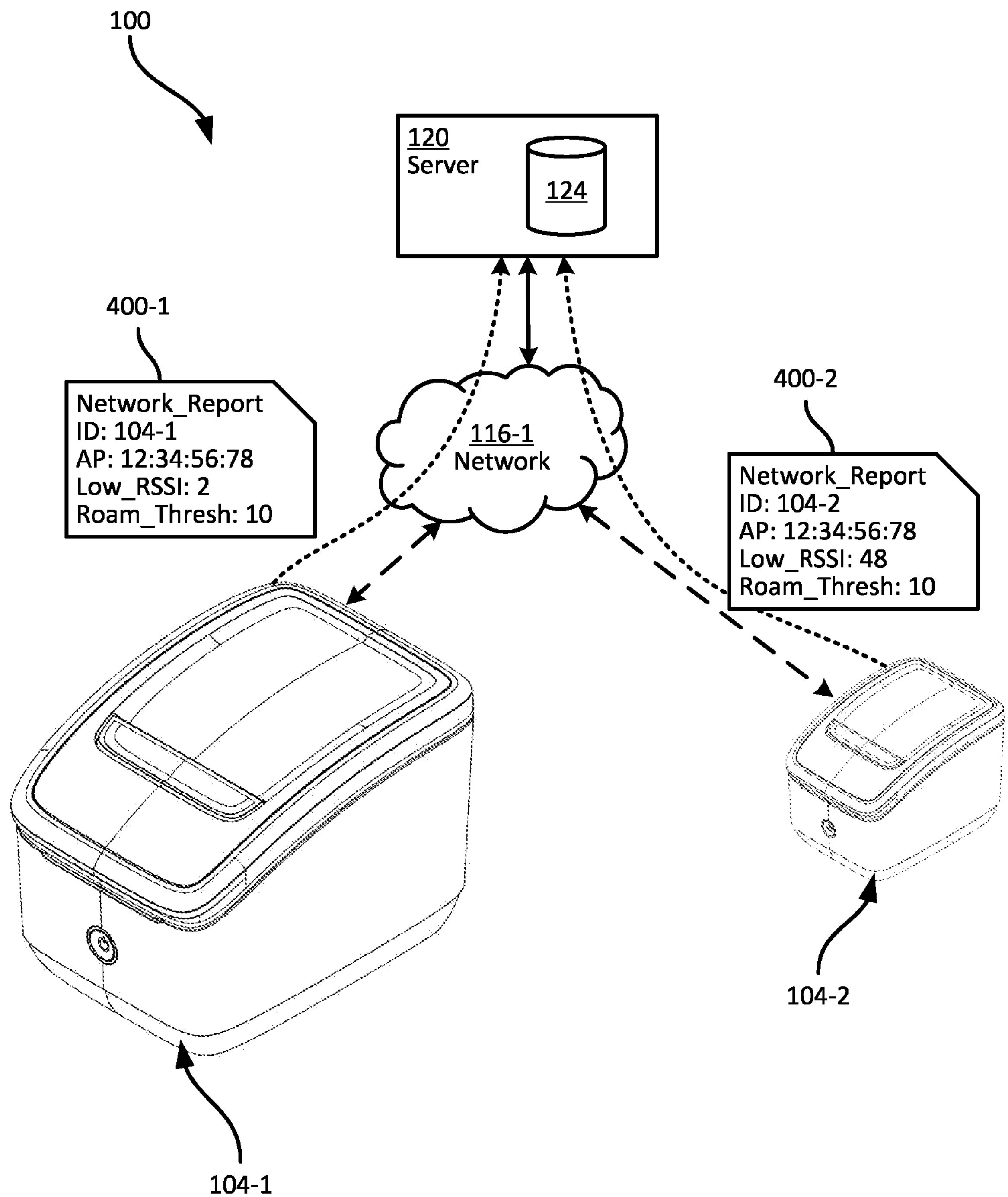
FIG. 4 is a diagram illustrating a further example performance of blocks 305 and 310 of the method of FIG. 3.

FIG. 4 illustrates the transmission of connection parameters by the printers 104-1 and 104-2 to the server 120, in respective reporting messages 400-1 and 400-2. The content of the reporting messages 400 can be structured according to a predetermined application programming interface (API) employed by the server 120 and the printers 104 to exchange data. For example, each message 400 can include a label "Network_Report" (or any other suitable indicator) that marks the message 400 as containing connection parameters.

As shown in FIG. 4, each reporting message 400 includes an identifier of the printer 104 itself (e.g., 104-1 or 104-2), as well as a set of connection parameters. In this example, the parameters include a MAC address (shortened for this illustration) of the access point in the network 116-1 with which the printers 104 are connected (e.g., "12:34:56:78"). The reported parameters also include a count ("Low_RSSI"), over a predetermined time period (e.g., one day, although other time periods can also be employed), of instances in which the RSSI measured from signals from the access point fell below a threshold. The threshold itself may also be reported, e.g., in the form of an RSSI threshold below which the printer 104 initiates a scanning operation to seek other access points (that is, a roam scan trigger threshold, "Roam_Thresh").

Returning to FIG. 3, in some examples, as shown in FIG. 4, the reporting of network connection parameters at block 305 can be initiated automatically by the printers 104. In other examples, the reporting of network connection parameters can be initiated by the server 120. That is, the server 120 can send a request for connection parameters according to the above-mentioned API, e.g., identifying which specific parameters are to be reported. In further examples, the server 120 can send the scheduling and reporting settings mentioned above to the printers 104, to configure the timing and content of future reporting messages 400 from the printers 104.

Whether the server 120 receives the connection parameters passively, or expressly requests the parameters from the printers 104, at block 310 the server 120 therefore receives the connection parameters from one or more printers 104. In some examples, connection parameters are received from all printers 104, although not necessarily simultaneously.

At block 315, the server 120 is configured to store the connection parameters received from the printer(s) 104 at block 310. The server 120 can store the parameters in the repository, e.g., in association with a unique identifier of the corresponding printer 104. In some examples, the server 120 can process the received parameters prior to storage in the repository, e.g., to anonymize certain parameters. For example, turning to FIG. 5, two example records 500-1 and 500-2 are shown in the repository following respective performances of block 315 to store the parameters contained in the messages 400-1 and 400-2 from FIG. 4.

In particular, the record 500-1 corresponds to the printer 104-1, and includes the parameters in the message 400-1 with the exception of the access point MAC address. In the illustrated example, the server 120 stores the OUI (e.g., the first half of the MAC address) and may discard the remainder of the access point MAC address. In addition, the server 120 can derive additional parameters from those reported by the printers 104. For example, the records 500-1 and 500-2 each contain a count ("No. APs") of distinct access points that the printers 104-1 and 104-2 have reported connections with over a predetermined time period (e.g., one week, although various other time periods are also contemplated).

Returning to FIG. 3, in some examples, at block 315 the server 120 can also generate and store aggregated connection parameters from the individual sets of parameters reported by the printers 104. For example, in addition to the printer-specific records 500, the server 120 can generate and store one or more aggregated records containing parameters derived from data reported by a plurality of printers 104. An example aggregated record can include an OUI identifying a particular access point manufacturer, and a count, for that OUI across all the printers 104 in the system 100 with one or more settings enabled, of reported failed connection attempts. For example, such an aggregated record to include a count of reported failed connection attempts across all printers 104 with PMF enabled, for a given OUI. A wide variety of other aggregated data will now also occur to those skilled in the art. Such aggregated records can be used to identify trends in the population of printers 104 in the system 100, such as a particular access point manufacturer having a PMF implementation that leads to unstable connections (and therefore numerous connection failures).

The server 120 can be configured to transmit, display, or otherwise output, the printer-specific parameters and/or the aggregated parameters mentioned above, e.g., for viewing and processing by an operator of the server 120. At block 320, the server 120 can optionally (as indicated by the dashed outline of block 320) receive one or more configuration update definitions for storage in the memory 254. The configuration update definitions can be received as input data from an operator of the server 120, for example.

Each configuration update definition defines one or more criteria as well as payload data. In general, when reported parameters from a given printer 104 satisfy the criteria of a configuration update definition, the server 120 is configured to send the payload data of that configuration update definition to the relevant printer 104. As will be discussed below, the deployment of payload data enables the server 120 to dynamically reconfigure a printer 104, e.g., by altering network connection settings at the printer 104 to optimize wireless connectivity performance at the printer 104, mitigate observed connectivity problems at the printer 104, or the like.

At block 325, the server 120 is configured to determine, for at least one of the printers 104, whether the reported connection parameters from block 310 satisfy the criteria of any stored configuration update definitions.

Figure 5:
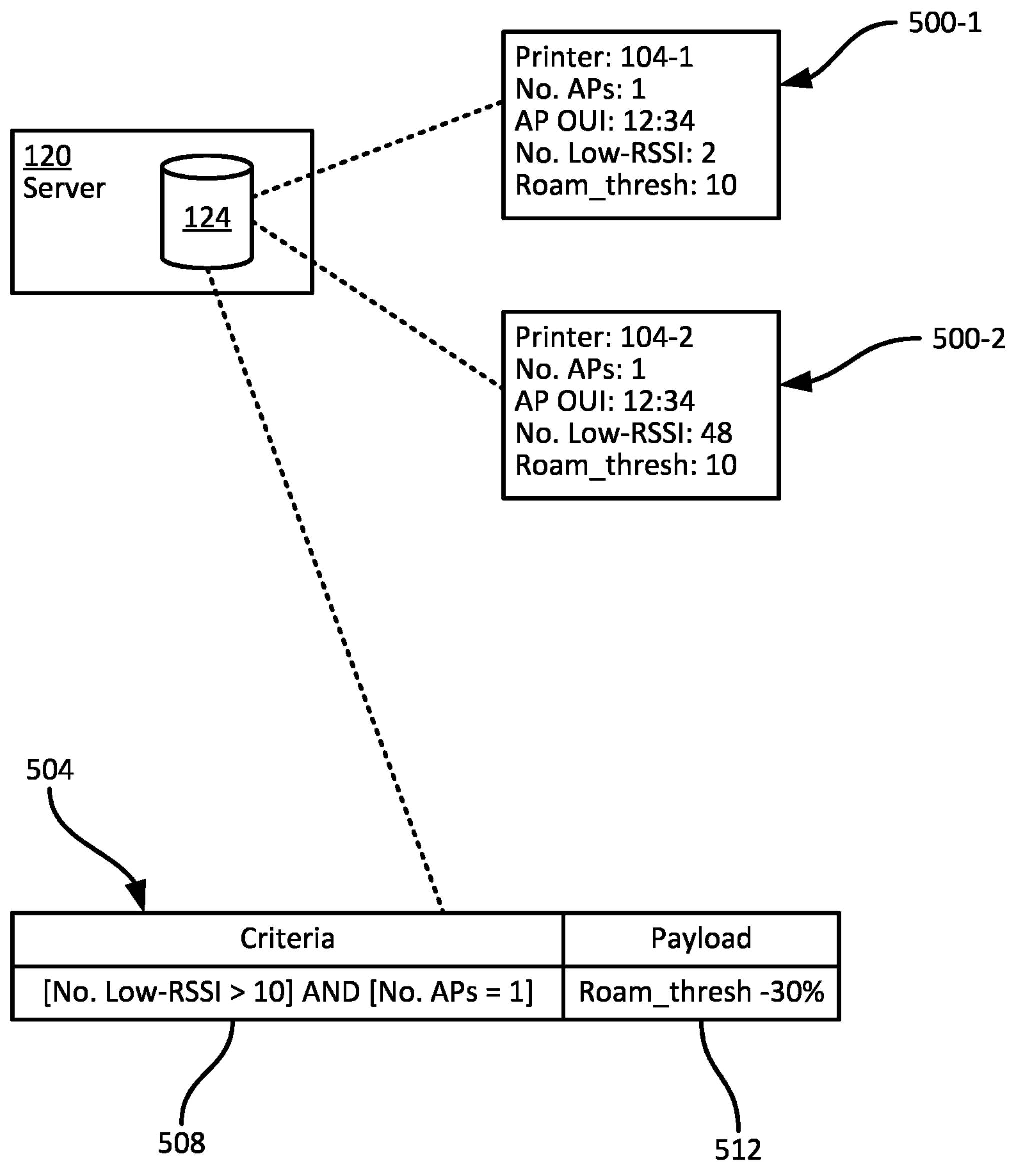
FIG. 5 is a diagram illustrating an example performance of blocks 315 and 320 of the method of FIG. 3.

FIG. 5 illustrates an example configuration update definition 504, including at least one criterion 508, and corresponding configuration update payload data 512. In the illustrated example, the criteria 508 include two criteria, both of which must be satisfied in order for the determination at block 325 to be affirmative (as indicated by the boolean operator "AND" separating the criteria). The criteria in the illustrated example include a first criterion requiring that a reported number of low-RSSI events exceed ten, and a second criterion requiring that a count of access points to which the printer 104 has reported connections with be equal to one.

The criteria 508 set out above seek to identify printers 104 that are within range of only a single access point, e.g., whether because the network 116 is a small-scale network implemented by a single access point, or because the printer 104 is in a location that places it out of range of any other access points. The criteria 508 further seek to identify printers that have reported numerous roam scan trigger events, which cause the printers 104 to initiate roam scan operations that may increase congestion on the network 116, interrupt regular operations of the printers 104, increase battery drain if the printers 104 are battery-powered, and the like. The combination of the two illustrated criteria, therefore, seeks to identify printers 104 that are likely attempting to roam but failing to do so because no other access points are available. The payload data 512 therefore applies a reduction in the roam trigger threshold (e.g., 30% in this example, although a wide variety of other fractional or absolute reductions, or explicit values, can be applied). The payload data 512, in other words, can be used to dynamically alter the roam trigger threshold at such printers 104, to reduce the frequency of ineffective roam attempts at the printers 104.

At block 325, therefore, the server 120 can compare the reported parameters from each printer 104 to each available configuration update definition. In other words, the reported parameters from a given printer 104 can satisfy as few as zero criteria in some cases, but may satisfy the criteria of multiple definitions in other cases.

When the determination at block 325 is negative, the server 120 returns to block 310, to continue collecting and processing reported connection parameters as described above. When the determination at block 325 is affirmative, however, the server 120 proceeds to block 330. At block 330, the server 120 is configured to send a configuration update command to the relevant printer(s) 104. The configuration update command contains the payload data 512 of the configuration update definition satisfied by the reported parameters of the relevant printer 104.

Figure 6:
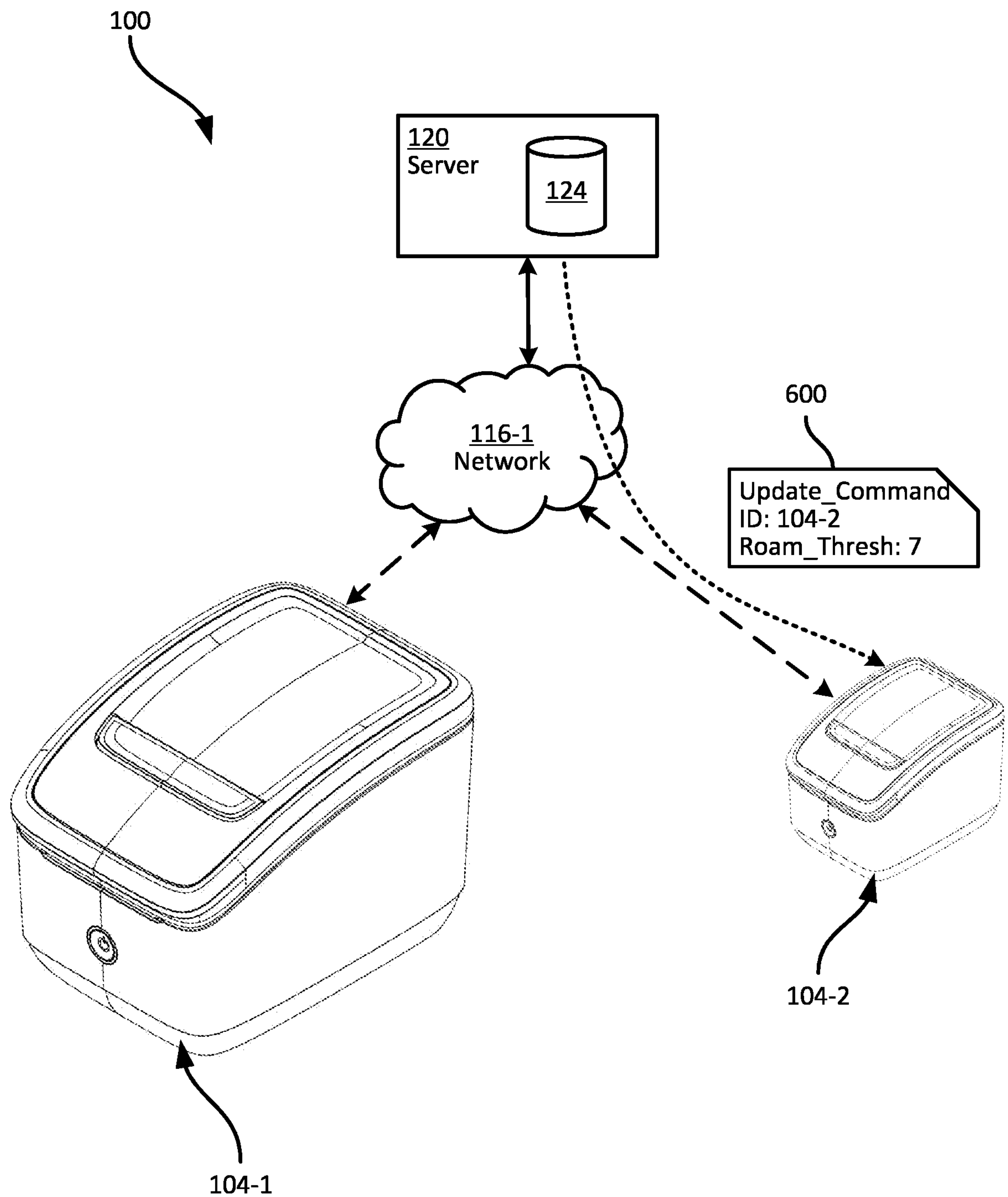
FIG. 6 is a diagram illustrating an example performance of block 330 of the method of FIG. 3.

For example, as shown in FIG. 5, the reported parameters of the printer 104-2 satisfy the criteria 508 of the definition 504. Specifically, the printer 104-2 reported forty-eight low-RSSI events (exceeding the threshold of ten in the criteria 508), and has reported only one access point. Therefore, at block 330 the server 120 is configured to generate and send an update command to the printer 104-2, containing the payload data 512 (or data derived from the payload data 512). As shown in FIG. 6, for example, the server 120 can send a command 600 according to the previously mentioned API, including a label such as "Update Command" and an updated setting based on the payload data 512. In the illustrated example, the command 600 includes a setting update to the roam trigger threshold, decreasing the previous threshold of ten (as seen in FIG. 4) by 30% to seven.

Returning to FIG. 3, at block 335 the printer 104-2 is configured to determine, after sending the network parameters to the server 120 at block 305, whether any update commands have been received. When the determination at block 335 is negative, the printers 104 can continue reporting connection parameters and awaiting update commands. In the example shown in FIG. 6, the determination at block 335 is affirmative for the printer 104-2, and the printer 104-2 thus proceeds to block 340. At block 340, the printer 104-2 is configured to update the relevant setting in the memory 204, according to the command 600. The printer 104-2 then returns to block 305, to continue reporting connection parameters.

The performance of the method 300 therefore enables the dynamic reconfiguration of the printers 104 by the server 120, which may allow the system 100 to proactively mitigate network connectivity issues before the operators of the printers 104 perceive such issues. Connectivity at the printers 104 may therefore be improved, and the consumption of technical support resources at a manufacturer of the printers 104, or other supporting entity, may be reduced.

A wide variety of other example configuration update definitions are also contemplated, beyond the specific example set out above. For example, a further definition can include criteria to select printers 104 connected to access points from a particular manufacturer (i.e., with a specific OUI), and with a specific setting (such as PMF) enabled. The corresponding payload can include a command to disable PMF, e.g., if it is observed that enabling PMF causes connection failures for printers connected to access points from the identified manufacturer.

The server 120 can also implement various auxiliary functions related to the collection and processing of connection parameters. For example, certain configuration update definitions can include payloads that, in addition to or instead of modifications to configuration settings, cause the server 120 to generate notifications. The server 120 can store account identifiers and/or device identifiers corresponding to computing devices associated with operators of the printers 104. Thus, for example, if a printer 104 exhibits frequent dropped connections and/or high latency, as well as frequent low-RSSI events, the server 120 can be configured to generate a notification to one or more associated computing devices, e.g., suggesting that the printer 104 be re-located closer to an access point.

More generally, the payload data in any given configuration update definition can include any combination of network configuration settings, firmware update commands (or updated firmware itself), notifications, and the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a server, comprising:

storing, at the server, a configuration update definition including (i) criteria, and (ii) configuration update payload data;

obtaining at the server, from a computing device having a connection to a wireless local area network (WLAN), a parameter of the connection;

determining whether the parameter satisfies the criteria of the configuration update definition; and in response to determining that the parameter satisfies the criteria, transmitting the configuration update payload data to the computing device.

2. The method of claim 1, wherein obtaining the parameter includes:

transmitting, from the server to the computing device, a reporting command to cause the computing device to transmit the parameter.

3. The method of claim 2, wherein the reporting command includes identifiers of a plurality of distinct parameters of the connection; and wherein the obtaining includes receiving the parameters from the computing device.

4. The method of claim 1, wherein the parameter of the connection includes at least one of:

(i) a received signal strength indicator (RSSI), (ii) a signal-to-noise ratio (SNR) indicator, (iii) an identifier of an access point of the WLAN.

5. The method of claim 4, wherein the identifier of the access point includes an original equipment identifier (OUI).

6. The method of claim 1, wherein the configuration update payload includes a network configuration setting used by the computing device to establish the connection.

7. The method of claim 1, wherein the configuration update payload includes a firmware update for the computing device.

8. The method of claim 1, further comprising:

receiving further connection parameters from a plurality of additional computing devices; and obtaining the configuration update definition based on the connection parameters.

9. The method of claim 1, wherein the criteria include at least one of:

(i) a received signal strength indicator (RSSI) threshold, (ii) a signal-to-noise ratio (SNR) threshold, (iii) a target original equipment identifier (OUI).

10. A server, comprising:

a memory storing a configuration update definition including (i) trigger criteria, and (ii) configuration update payload data; and a processor configured to:

obtain, from a computing device having a connection to a wireless local area network (WLAN), a parameter of the connection;

determine whether the parameter satisfies the trigger criteria of the configuration update definition; and in response to determining that the parameter satisfies the trigger criteria, transmit the configuration update payload data to the computing device.

11. The computing device of claim 10, wherein obtaining the parameter includes:

transmitting, from the server to the computing device, a reporting command to cause the computing device to transmit the parameter.

12. The computing device of claim 11, wherein the reporting command includes identifiers of a plurality of distinct parameters of the connection; and wherein the obtaining includes receiving the parameters from the computing device.

13. The computing device of claim 10, wherein the parameter of the connection includes at least one of:

(i) a received signal strength indicator (RSSI), (ii) a signal-to-noise ratio (SNR) indicator, (iii) an identifier of an access point of the WLAN.

14. The computing device of claim 13, wherein the identifier of the access point includes an original equipment identifier (OUI).

15. The computing device of claim 10, wherein the configuration update payload includes a network configuration setting used by the computing device to establish the connection.

16. The computing device of claim 10, wherein the configuration update payload includes a firmware update for the computing device.

17. The computing device of claim 10, further comprising:

receiving further connection parameters from a plurality of additional computing devices; and obtaining the configuration update definition based on the connection parameters.

18. The computing device of claim 10, wherein the criteria include at least one of:

(i) a received signal strength indicator (RSSI) threshold, (ii) a signal-to-noise ratio (SNR) threshold, (iii) a target original equipment identifier (OUI).

* * * * *